United States Patent Office 3,431,246
Patented Mar. 4, 1969

3,431,246
METHOD FOR THE PREPARATION OF ORGANIC COPOLYMERS OF HIGH MOLECULAR WEIGHT CONTAINING DOUBLE BONDS AND EPOXY GROUPS
Bernardino Vecellio, Milan, Italy, assignor to Pirelli S.p.A., Milan, Italy
No Drawing. Filed Dec. 19, 1963, Ser. No. 331,953
Claims priority, application Italy, Jan. 11, 1963, 627/63
U.S. Cl. 260—80.7  7 Claims
Int. Cl. C08d 3/02; C08f 19/00

The present invention relates to organic copolymers obtained by direct synthesis, having a high molecular weight and containing in their structure both double bonds between carbon atoms and pendent epoxy groups. The invention further concerns a method for the preparation of said copolymers by direct synthesis, by starting from the suitable monomers.

It is known that it is possible to obtain organic polymers of high molecular weight, in particular of the elastomeric type, which contain, besides double bonds between carbon atoms, also epoxy groups. Up to the present time this result was obtained by treating unsaturated elastomers, as for instance natural rubber or 1,4 cis-polyisoprene—under suitable conditions—by means of hydrogen peroxide or of an organic peracid, as for instance peracetic acid, perbenzoic acid and perphthalic acid, so as to carry out a more or less complete epoxidation, namely by introducing in place of a certain number of previously existing double bonds, a corresponding number of oxygen atoms "bridged" with the two adjacent carbon atoms which were bonded by the double bond. In this way epoxy or oxirane groups of the type

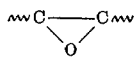

were formed inside the linear chain of the macromolecule, whereas a major or minor part of the double bonds remained unchanged. According to this method, the epoxidation of unsaturated elastomers could also be carried out with synthetic elastomers of known type having a more or less branched structure; in that case the epoxy groups could be distributed at random also in the lateral chains.

The above indicated already known epoxy polymeric products had however in common the undesired feature that the epoxidation by means of the above cited chemical agents unavoidably involved also the introduction, even to a great extent, of hydroxy groups and furthermore, in the case of agents of the peracid type, of ester groups in which the acyl radicals are derived from the used peracids.

Moreover, and this was particularly undesirable in the case of the elastomers, the treatment carried out with said agents originated in all events a more or less deep oxidative degradation of the macromolecules, which obviously resulted in a considerable reduction of the physical and mechanical properties of their vulcanizates. These vulcanizates could of course be obtained by cross-linking both with sulphur, in the presence of the normal rubber accelerators, and with the curing agents, or "hardeners," employed in the field of conventional epoxy resins.

It is also known that it is possible to obtain organic copolymers, even of high molecular weight, and containing epoxy groups, by polymerizing with a free radical mechanism, and generally in solution, vinyl monomers, as for instance styrene, with alkenylepoxy monomers, i.e. with compounds having in their molecule both a double bond between two carbon atoms and epoxy groups. The copolymerization carried out in this way results in the epoxy group remaining unchanged in the resulting copolymer, in the structure of which, however, there are no double bonds between carbon atoms.

Also copolymers of alkenyl-epoxy monomers, as for instance the glycidyl esters of the unsaturated acids, with non-conjugated diene monomers, in particular divinylbenzene, are already known. These copolymers, always obtained by a free radical polymerization and forming the base of already known ion-exchange resins, have also a structure in which there are no double bonds between carbon atoms.

Also copolymers of the alkenyl-epoxy monomers with other epoxy monomers, and in general with monomers of the cyclic-ether type, as obtained by copolymerization due to the opening of the cycloetheric groups originated by catalysts of the ionic type, are already known. It is evident that said copolymers have a structure characterized by the presence of atoms of etheric oxygen in the main chain and of double bonds between carbon atoms, in pendent groups, but practically free of epoxy rings, the opening of which gave rise to the copolymerization.

The object of the present invention is to provide organic copolymers, obtained by direct synthesis, having a high molecular weight and containing in their structure, before cross-linking, both double bonds between carbon atoms and pendent epoxy groups. This structure is particularly advantageous since it offers the possibility of being cross-linked in two different ways, even in combination with each other, namely by means of the olefinic double bonds and by means of the epoxy groups, and furthermore allows the utilization of the reactivity of the latter also for other purposes.

A further object of the present invention is to provide copolymers of the above cited type, in which the macromolecules in the uncured condition are practically free of cross-links so as to be soluble in the organic solvents and have a controlled length and permitting the obtention of vulcanized products having good physical and mechanical characteristics.

A still further object of the invention is to provide a method for the preparation of said copolymers by direct synthesis, by starting from suitable monomers.

The new copolymers provided in accordance with the present invention are copolymers obtained by direct synthesis, of high molecular weight, soluble in organic solvents, having an intrinsic "Vistex" viscosity at 30° C. in a toluene-isopropanol mixture (80:20 parts by volume), evaluated on said copolymers when obtained in emulsion, higher than $$0.5 \frac{100 \text{ ml.}}{\text{g.}}$$

cross-linkable by two different methods and consisting of molecular chains the skeleton of which is formed by carbon atoms bonded to one another by means of both single and double bonds and comprising pendent atoms and atomic groups, at least a part of said atomic groups comprising at least one epoxy group, said copolymers being constituted by, or comprising in their structure, recurring monomeric units of two different types, respectively corresponding to the following formulae:

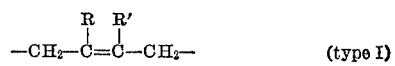

(type I)

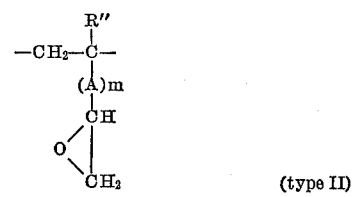

(type II)

in which in the first formula R and R', independently of each other, are selected from a group comprising a hydrogen atom, a chlorine atom and a methyl group, and in the second formula A is constituted by a bivalent organic radical, $m$ is an integer lower than 2, whose value can also be zero, and R" is selected from a group comprising a hydrogen atom, a chlorine atom and a monovalent alkyl group containing up to 4 carbon atoms, the ratio by weight between the total of the monomeric units of type I and the total of the monomeric units of type II ranging between 98:2 and 1:4, and preferably between 19:1 and 1:2.

As said above, in the formulae of the monomeric units of type I and type II, R, R', R", A and $m$ can have various significations. In this connection it is to be noted that in the structure of the same copolymer the monomeric units corresponding to the general formula of each of the above indicated types can be equal to one another or different.

The copolymers in accordance with the present invention, besides displaying the essential coexistence of the monomeric units of types I and II, can contain in their structure also monomeric units of another type, corresponding to the general formula

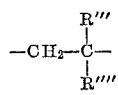    (Type III)

in which R''' is selected from among a hydrogen atom, a chlorine atom and an alkyl group containing up to 4 carbon atoms, and R'''' is a monovalent organic radical selected from among a phenyl group, a pyridyl group either as such or substituted, a cyanogen group, a carboxy group either as such or esterified, a methoxy group, an ethoxy group and a 2-methyl-propoxy group.

The total weight of the monomeric units of type III will be preferably not greater than ⅔ of the total weight of the monomeric units of types I and II.

Preferably in the monomeric units of type I, either R and R' are both hydrogen atoms or, no matter which, one is a methyl group and the other a hydrogen atom or, no matter which, one is a chlorine atom and the other a hydrogen atom.

According to a preferred alternative embodiment, in the monomeric units of type II, $m$ is equal to 1 and A is constituted by a —COOCH₂— group; consequently said monomeric units correspond to the following formula:

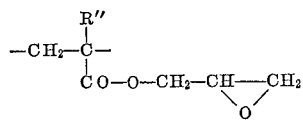

in which R" is preferably constituted by a hydrogen atom or by a methyl group.

According to another preferred embodiment, $m$ is still equal to 1, and A is constituted by the group —C₆H₄—O—CH₂—; consequently the monomeric units of type II correspond to the formula:

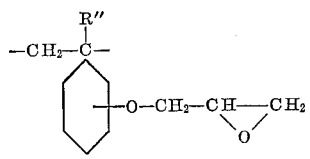

in which the glycidoxy group can be bonded to the benzene nucleous in ortho-, meta- or para-position; in this formula R" is preferably constituted either by a hydrogen atom or by a methyl group.

In the monomeric units of type II, $m$ being still equal to 1, A can also be constituted by the group —OCH₂— in which the oxygen atom is directly bonded to the main chain; in this case R" can be constituted either by a hydrogen atom or by a methyl group.

The above description concerns the significations which R and R' can assume in the formula of the monomeric units of type I and, separately, the significations which R" can assume in the formula of the monomeric units of type II. It is considered advisable to indicate herebelow some preferred combinations of the significations of the three symbols R, R' and R".

In one combination, R, R' and R" are hydrogen atoms, in another combination R and R' are hydrogen atoms and R" is a methyl group; in another combination R and R', no matter which, are one a methyl group and the other a hydrogen atom, and R" is a hydrogen atom; in another combination R and R', no matter which, are one a hydrogen atom and the other a methyl group, and R" is a methyl group; in another combination R and R', no matter which, are one a chlorine atom and the other a hydrogen atom, and R" is a hydrogen atom; in another combination R and R', no matter which, are one a chlorine atom and the other a hydrogen atom, and R" is a methyl group.

In the above indicated combinations the monomeric units of type II can advantageously have A constituted either by the group —CO—O—CH₂—, or by the group —C₆H₄—O—CH₂, $m$ being equal to 1 in both units.

As said above, the new copolymers in accordance with the present invention, characterized by the coexistence of the monomeric units of types I and II, can also comprise monomeric units of type III.

The various significations that the single R''' and R'''' can assume have also been indicated above. Among the various combinations of said significations, the preferred ones are those in which R''' and R'''', no matter which, are a hydrogen atom and a phenyl group, a hydrogen atom and a carboxy group, a methyl group and a carboxy group.

It is to be specified in this connection that also the monomeric units of type III present in the copolymer, as already said in respect of those of types I and II, can be of different species, preferably selected among the ones indicated above.

The present invention also concerns a method for the preparation of the copolymers as defined above.

It has in fact been discovered that it is possible to polymerize conjugated dienes with alkenyl-epoxy compounds, in particular alkenyl-glycidyl compounds, and in some cases with other monomers, by maintaining unchanged the epoxy rings, owing to the absence of any compound which may catalyze polymerization of ionic type, and conducting instead free-radical copolymerization of said monomers with opening of the double bonds between carbon atoms, to obtain the above indicated copolymers of high molecular weight.

More precisely, the method for the preparation of said copolymers consists in that the monomers intended to give the above considered monomeric units are copolymerized in aqueous emulsion with a free radical mechanism, at a temperature ranging between 5° and 60° C. and at a pH ranging between 6 and 8.

These are the essential conditions in order that the epoxy groups contained in the monomers, which have to remain unchanged in the copolymers, will not be modified during copolymerization.

It is necessary to bear in mind that in the methods now in use, in particular for the manufacture of butadiene-styrene rubbers, polymerization is carried out at a rather high pH, due to the presence, as emulsifiers of the monomers, of alkaline salts of fatty and/or resin weak acids.

This manufacturing method cannot be adopted to the purposes of the preset invention since in the presence of water, during copolymerization and storage of the resulting latex, the opening of the oxirane rings contained in the monomers and in the copolymers, with consequent formation of hydroxy groups, could take place.

In the method according to the present invention, in order to obtain a substantially neutral system, the emulsifiers used are alkaline salts of acids selected in the group of the alkylsulphonic, arylsulphonic, alkylarylsulphonic acids, as for instance the product sold by E. I. du Pont de Nemours & Co. under the name of Aquarex D (mixture of sulphonated fatty alcohols), the product sold by Badische Anilin and Soda Fabrik A.G. under the name of Nekal BX (sodium alkylnaphthalenesulphonate) and the product sold by Rohm & Haas Co. under the name of Tamol N, called in Europe Orotan N (sodium salt of alkylnaphthalene-sulphonic acid polycondensed with formaldehyde).

In aqueous solution the latter products have a lower alkaline pH; they act also in a slightly acid medium and therefore allow the solution to be adjusted to a pH of a value near the neutral point, either by means of the addition of a small amount of a weak acid, as for instance acetic acid in diluted aqueous solution or by means of the addition of alkalies in aqueous solution, when comonomers of acid nature, as the acrylic and methacrylic acids, are used.

Other emulsifiers, which also allow the obtention of a medium having a pH included in the above indicated limits, are for instance those of the non-ionic type constituted by condensation products of the cyclic olefinic oxides, as for instance ethylene oxide and the proplyene oxide, with hydroxy compounds, such as oleic alcohol. The use of alkaline salts of sulphonic acids indicated above is however preferred.

These emulsifiers are employed in amounts which, in total, are not higher than 10% based on the total weight of the monomers, in an aqueous medium, at conventional ratios (generally from 150 to 250 parts by weight of water per 100 parts of monomers).

The initiating system of the free radical copolymerization is a system of the "redox" type, comprising an organic hydroperoxide and sodium formaldehyde-sulphoxylate, each of them in an amount lower than 1% by weight based on the total weight of the monomers.

Isopropylbenzene hydroperoxide is preferred in particular. By the use of suitable ratios, this polymerization system, which normally is not excessively rapid, allows the obtention of the required type of copolymer under generally mild temperature conditions, with a wide range of ratios by weight of the monomers, and with conversion rates sufficiently high to be industrially advantageous.

Equally good results and still higher polymerization rates can be obtained by using as initiating agents other organic hydroperoxides, such as diisopropylbenzene hydroperoxide and paramenthane hydroperoxide.

The need of operating in a neutral or substantially neutral medium in accordance with the present invention does not allow the use of the mercaptanic modifiers usually employed for the "regulation" of molecular weights in polymerization in aqueous emulsion, since said modifiers are solubilized and act only in alkaline medium and moreover could react with the epoxy groups.

In place of them, in the method according to the present invention, the xanthogen disulphides, and in particular diisopropylxanthogen disulphide, are advantageously used as modifiers, in an amount lower than 1% based on the total weight of the monomers, so that a wide range of molecular weights of the resulting copolymers can be obtained.

For the sake of simplicity, in the present description, isopropylbenzene hydroperoxide (cumene hydroperoxide) and diisopropylxanthogen disulphide will be hereinafter indicated with the letters CHP and DPXD, respectively.

When the copolymerization has reached the desired conversion degree, it is short-stopped by means of conventional inhibitors, as for instance hydroquinone, tert. butyl cathecol and others, in an amount of about 0.1% based on the weight of the monomers, and obtained aqueous dispersion of the copolymer is stabilized with conventional stabilizers which deactivate the free radicals (without however originating the opening of the epoxy rings), as for instance the trialkylphenylphosphites.

Finally, the amounts of monomers of the various types which have not reacted are eliminated, by means of a known process, i.e. "stripping," consisting essentially of a vacuum steam distillation.

The aqueous dispersions, which in technical terminology are also called "latices," in case they are to be used as such are brought to the desired solid content either through concentration by distillation at a reduced pressure of the aqueous phase, or by a dilution with water.

From the obtained latices it is possible to prepare the copolymers in a dry condition, i.e. with a moisture content corresponding to the hygroscopic humidity, either by total evaporation of the aqueous phase or by coagulation with solutions of electrolytes which must be solely of the neutral saline type, e.g. sodium chloride, in order to prevent the opening of the oxirane rings; it is worth noting that this latter way differs from the conventional procedure as performed with the normal rubbers of the SBR type, in which case a strong acid is used in combination with the sodium chloride.

The so obtained coagula are thoroughly washed in running water and dried in an oven under vacuum in an atmosphere of inert gas, such as nitrogen, in order that undue oxidation and cross-linking phenomena may not take place.

The monomers suitable for yielding the monomeric units of type I corresponds to the general formula:

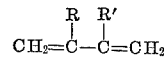

The monomers suitable for yielding the monomeric units of type II correspond to the general formula:

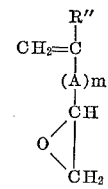

The monomers suitable for yielding the monomeric units of type III, when present in the copolymers, correspond to the general formula:

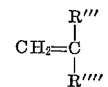

All symbols appearing in said general formulae of the monomers, more precisely R, R', R", R''', R'''', A and $m$, maintain the same significations as indicated above with reference to the structure of the copolymers.

The monomers suitable to originate in the copolymers the monomeric units of type I are organic compounds belonging to the class of the conjugated dienes. Said organic compounds are preferably selected from among 1,3-butadiene and its homologues, as isoprene and 2,3-dimethylbutadiene, and chloroprene.

The monomers suitable to originate in the copolymers the monomeric units of type II are organic compounds having in their molecule both one alkenyl group and at least one epoxy group.

Said organic compounds are preferably selected from among the glycidyl esters of acrylic, alpha-chloroacrylic, alpha-methylacrylic (or methacrylic) and alpha-ethylacrylic acids, and of the isomeric alpha-propylacrylic and alpha-butylacrylic acids; said organic compounds can be advantageously selected also from amoung the glycidyl ethers of ortho-, meta-, para-vinylphenol, of ortho-, meta, para-isopropylphenol, of 4-vinylresorcinol and of the vinylnaphthols. They can also be selected from among vinylglycidyl ether, isopropenylglycidyl ether and their homologues.

The monomers intended to originate in the copolymers the monomeric units of type III are organic compounds having in their molecule one alkenyl group and no epoxy groups, although they may contain other functional groups of different type. Said compounds are preferably selected from among styrene, acrylic acid and alpha-methylacrylic (or methacrylic) acid. Other compounds can be employed, among which may be mentioned alpha-methylstyrene and the nucleus-substituted styrenes, the vinyl-pyridines and their derivatives, acrylonitrile and its homologues, the alkyl and aryl esters of acrylic, alpha-methylacrylic (or methacrylic) acids and their homologues (as methyl- or ethyl-acrylate or methyl- or ethyl-methacrylate), the alkylvinyl ethers, such as methylvinyl-, ethylvinyl- and isobutylvinyl-ethers.

These organic compounds can be used both alone and in combination. The combined use of styrene and acrylic acid or of styrene and alpha-methylacrylic acid as monomers suitable to originate in the copolymers the units of type III has proved particularly advantageous.

Since the ratios by weight of the used monomers, besides other factors (as for instance the reaction temperature, the obtained conversion rate, etc.) affect in general the ratios by weight of the monomeric units contained in the macromolecules of the copolymers, in order to insure that the latter ratios in the copolymers forming the object of the present invention fall within the above indicated limits, it is necessary to use the various monomers in the proportions which can be deduced by the respective reactivity ratios. Actually, the total amount of the conjugated dienes used should range between 20% and 98% based on the total weight of the monomers, and preferably between 40% and 95%; the total amount of the alkenyl-epoxy monomers used should range between 2% and 80% based on the total weight of the monomers and preferably between 5% and 60%.

The total amount of the monomers used containing one alkenyl group and no epoxy groups is in any event lower than 40% based on the total weight of the monomers.

The copolymers described in the present invention have a high molecular weight. In fact, in the latices obtained according to the described method, the intrinsic "Vistex" viscosity of the copolymers, evaluated following the D. A. Henderson and N. R. Legge's method (Canadian Journal of Research, year 1949, B 27, page 666) is always higher than $$0.5 \frac{100 \text{ ml.}}{\text{g.}}$$

and generally higher than $$0.7 \frac{100 \text{ ml.}}{\text{g.}}$$

The content of monomeric epoxy units of the copolymers can be evaluated by titration of the epoxy groups with hydrochloric acid in dioxane.

The products resulting from the copolymerization carried out in this way are elastomeric copolymers or resinous copolymers according to the ratio by weight between the monomers used. These copolymers, all having a high molecular weight, contain in their macromolecules unsaturation of olefinic type and, as peculiar but not exclusive constituents, pendent epoxy groups sometimes in large number.

For a better understanding of the above described method, some non-limiting examples, also setting forth the features of the obtained copolymers, are given herebelow; in this connection it is pointed out that in the polymerization formulations the parts are always given by weight or, in the case of the peroxide, the parts are given by weight of the active product.

Example 1

This example relates to the preparation in aqueous emulsion of unsaturated elastomeric terpolymers containing in their moleclue epoxy groups due to the presence of monomeric units of glycidyl acrylate.

In order that these epoxy groups, present in the molecule of the monomer, may remain unchanged also in the terpolymer, it is necessary, as said above, to operate in a substantially neutral medium. This can be conveniently achieved by using the following formulation which permits to effect polymerization at a pH ranging between 6 and 8, at temperatures of the order of room temperature and at considerably high conversion rates.

| Test No. | 1A | 1B |
|---|---|---|
| Butadiene | 60 | 47.5 |
| Styrene | 15 | 15 |
| Glycidyl acrylate | 25 | 37.5 |
| Water | 180 | 180 |
| Aquarex D | 4 | 4 |
| Tamol N | 0.25 | 0.25 |
| DPXD | 0.06 | 0.06 |
| CHP | 0.21 | 0.21 |
| Rodite A [1] | 0.2 | 0.2 |

[1] Sodium formaldehydesulphoxylate from Montecatini, Compagnia Generale per l'Industria Mineraria e Chimica.

The polymerization system is of the "Redox" type, in which the sodium formaldehydesulphoxylate acts by itself as a reducing agent of the hydroperoxide, whilst the diisopropylxanthogen disulphide acts as a regulator of the molecular weight.

It will be noted that this system substantially differs from the conventional systems of polymerization for the obtention of rubbers of the SBR type both in respect to the types of emulsifiers and to the pH, as well as, and above all, in connection with the latter, in respect to the initiating system.

Monomers of high purity are used, from which the inhibitors have been removed by distillation.

The operation is carried out as follows: the solution of the emulsifier is prepared by dissolving 4 parts of Aquarex D and 0.25 part of Tamol N in 170 parts of distilled water at room temperature. The pH of this solution (originally 8.4) is brought to 5.2–5.3 with the addition of about 0.2 ml. of 2 N acetic acid. The solution is poured into a pressure container, as for instance a conventional polymerization bottle. The preestablished amounts of styrene and of glycidyl acrylate and subsequently of DPXD, the latter as a 5% heptane solution, are then added; at last butadiene is added in excess amount and remaining excess is then eliminated in order to sweep out the air. The container is closed and the desired amounts of isopropylbenzene hydroperoxide, as a 5% heptane solution, and of Rodite A, as a 2% aqueous solution, are injected. After these additions, the pH of the resulting mixture ranges between 6 and 8.

The polymerization is carried out in a thermostatic bath at a temperature of 30° C. In Test 1A, 60% of the total amount of glycidyl acrylate is added at the beginning of the polymerization and the remaining 40% two hours later; also one half of the hydroperoxide is added at the beginning of the polymerization and the remaining half two hours later. In Test 1B all the additions are made at the beginning.

The polymerization is quite fast and, after 4½ hours, a conversion of 45% is reached in Test 1A and of 52% in Test 1B; after 7 hours said conversions reach 53.2% and 58.8%, respectively.

At this point the polymerization is stopped by the introduction into the container of 0.1% based on the total weight of monomers of hydroquinone (as inhibitor), as a 5% aqueous solution, and of 1% based on the total weight of monomers of Polygard (trialkylphenylphosphite of Naugatuck Chemical, Division of U.S. Rubber Company) (as stabilizer), as an aqueous emulsion.

The amount of monomers which have not reacted are eliminated by vacuum steam distillation. The resulting latices, the pH of which ranges between 6 and 8, are brought by distillation at reduced pressure to the desired solid content, generally about 30–35%; they are very stable, can be stored for a long time and can be used as such or subjected to coagulation in order to obtain the dry epoxy rubber. This latter operation is effected by adding to the latex a plain aqueous solution of sodium chloride, this being sufficient to obtain very good coagulation (unlike the case of conventional rubbers, for instance of the SBR type, where a strong acid is also added). Acid is not added since it could originate the opening of the epoxy rings, and in any event the salt by itself is able to bring about very good coagulation.

The coagula are thoroughly washed in running water and dried in an oven in an atmosphere of inert gas at reduced pressure. They appear as a rather tough rubber. When it is desired to obtain a solution of the polymer, for instance in benzene or in methylethylketone, it is advisable to use the coagulum still in the wet state, since otherwise its dissolution could be difficult.

Samples of rubbery copolymer obtained according to the above described method, coagulated, dissolved in benzene and then purified by precipitation with ethyl alcohol and swollen in dioxane, have shown by titration with hydrochloric acid the following content of monomeric units of glycidyl acrylate:

| | Percent |
|---|---|
| Test 1A | 20.5 |
| Test 1B | 30 |

The intrinsic "Vistex" viscosities of 30° C. in a toluene-isopropanol mixture (80:20 parts by volume) of polymers 1A and 1B are $$2.565 \text{ and } 1.805 \frac{100 \text{ ml.}}{\text{g.}}$$

respectively.

Example 2

This example relates to the preparation, in aqueous emulsion, of unsaturated elestomeric terpolymers in which the epoxy monomeric units derive from glycidyl methacrylate copolymerized in various amounts.

The polymerization formulations used in this example are analogous to those of Example 1, but differ from them, aside from the epoxy monomer, also in the emulsifier, since Nekal BX is here used in place of Aquarex D; also in this case the pH of the solution of the emulsifier (originally about 8.6) is modified by the addition of 2 N acetic acid in order to lower it to 5.2–5.3; after the addition of the other ingredients the pH of the final mixture is between 6 and 8.

Unless otherwise stated, the procedure followed is the same described in Example 1.

The following polymerization formulations are used:

| Test No | 2A | 2B | 2C | 2D | 2E |
|---|---|---|---|---|---|
| Butadiene | 70 | 60 | 60 | 25 | 40 |
| Styrene | 15 | 15 | 15 | 35 | 20 |
| Glycidyl methacrylate | 15 | 25 | 30 | 40 | 40 |
| Water | 180 | 180 | 180 | 180 | 180 |
| Nekal BX | 4 | 4 | 4 | 4 | 4 |
| Tamol N | 0.25 | 0.25 | 0.25 | 0.25 | 0.25 |
| DPXD | 0.06 | 0.09 | 0.09 | 0.09 | 0.09 |
| CHP | 0.18 | 0.28 | 0.35 | 0.56 | 0.84 |
| Rodite A | 0.2 | 0.2 | 0.2 | 0.2 | 0.2 |

In Test 2A, all the ingredients are added at the beginning.
In Test 2B, 60% of glycidyl methacrylate, DPXD and CHP are added at the beginning and the remaining 40% 5 hours later.
In Test 2C, the glycidyl methacrylate is added: one-half at the beginning, one-third 5 hours later and one-sixth 8 hours later. DPXD is added: two-thirds at the beginning and one-third 5 hours later. CHP is added: one-half at the beginning and one-quarter 5 and 8 hours later.
In Test 2D, DPXD is added: two-thirds at the beginning and one-third 18 hours later. The additions of CHP are: one-third at the beginning and one-sixth 18, 23, 25 and 43 hours later.
In Test 2E, one-half of the styrene is added at the beginning and one-half 8 hours later. The additions of glycidyl methacrylate are made as follows: 30% at the beginning, 20% 4½ hours later, 50% 8 hours later. DPXD is added: two-thirds at the beginning and one-third 4½ hours later. The additions of CHP are made as follows: one-third at the beginning and one-sixth 4½, 7½, 24 and 31 hours later.

The polymerization is carried out at a temperature of 30° C. and is stopped, as described in the preceding example, after the time hereafter indicated for each case, with reference to the obtained conversion. The following table also reports the percentage weight content of monomeric units of glycidyl methacrylate existing in the terpolymers at the indicated conversion, as determined with hydrochloric acid on the coagulated product after purification by precipitation from benzene, as described in Example 1.

| Test No | 2A | 2B | 2C | 2D | 2E |
|---|---|---|---|---|---|
| Polymerization time in hours | 16 | 10 | 24 | 48 | 55 |
| Conversion (percent) | 70 | 57 | 84 | 70 | 58 |
| Glycidyl methacrylate units in the final terpolymer (percent by weight) | 15.7 | 27.5 | 28 | 43.7 | 37.8 |

The table shows the possibility of obtaining the same conversion in very different times by varying the proportions of the monomers and the amounts of the hydroperoxide and of the modifying agent; moreover, various contents of the epoxy component are obtained.

Also, the latices of the terpolymers obtained in accordance with this example, the pH of which ranges between 6 and 8, are very stable and can be stored for a long time, or can be subjected to coagulation with a solution of sodium chloride. The dry products obtained in Tests 2A, 2B and 2C are of rubbery type, whereas those obtained in Tests 2D and 2E are more similar to resins which, too, can be cross-linked.

In order to demonstrate the importance of conversion reached during polymerization as far as the products of elastomeric type are concerned, the following table reports the plasticity values of the first three specimens, carried out with the known Wallace Rapid Plastimeter, used in the rubber industry.

| Test No.: | Wallace plasticity |
|---|---|
| 2A | 90 |
| 2B | 28 |
| 2C | 86 |

Since to a lower value corresponds a greater plasticity, and consequently a smaller average molecular weight, it is evident that the molecular weight increases with the progress of the polymerization and, still more, with the amount of diene monomer employed; consequently, at higher conversions, there is the possibility that molecules constituted by branched chains of carbon atoms are formed, as it is well-known in the production of SBR.

The specimens 2A and 2C appear in fact as very tough and springy rubbers, while specimen 2B has a normal consistency.

The intrinsic "Vistex" viscosities at 30° C. in a toluene-isopropanol mixture (80:20 parts by volume) of the copolymers from Tests 2A to 2E are 1.6, 1.3, 1.48, 1.1 and 0.92 $\frac{100 \text{ ml.}}{\text{g.}}$ respectively.

Example 3

This example shows the effect of the quantity and of the different method of addition of CHP and of DPXD on the polymerization rate of a system analogous, in all other respects, to the system of Test 2A of the preceding Example 2, namely by using 15 parts of the glycidyl methacrylate monomer based on a total of 100 parts of monomers.

The procedure is the same adopted for Test 2A, except where it is otherwise stated.

The following polymerization formulations are used:

| Test No. | 3A | 3B | 3C | 3D |
|---|---|---|---|---|
| Butadiene | 70 | 70 | 70 | 70 |
| Styrene | 15 | 15 | 15 | 15 |
| Glycidyl methacrylate | 15 | 15 | 15 | 15 |
| Water | 180 | 180 | 180 | 180 |
| Nekal BX | 4 | 4 | 4 | 4 |
| Tamol N | 0.25 | 0.25 | 0.25 | 0.25 |
| DPXD | 0.2 | 0.15 | 0.09 | 0.09 |
| CHP | 0.2 | 0.2 | 0.28 | 0.28 |
| Rodite A | 0.2 | 0.2 | 0.2 | 0.2 |

In Test 3A, the addition of DPXD is made as follows: one-half at the beginning, one-quarter 3 hours later and the other quarter 7 hours later. The addition of CPH is: 20% at the beginning and 10% every hour in the following eight hours.

In Test 3B, the additions are: DPXD, two-thirds at the beginning and one-third 7 hours later; CHP as in Test 3A.

In Test 3C, two-thirds of DPXD and of CHP are added at the beginning and one-third 8 hours later.

In Test 3D, two-thirds of DPXD and of CHP are added at the beginning and one-third 16 hours later.

The polymerization proceeds in the way shown in the following table:

| Test No. | Polymerization time (in hours) | Conversion, percent | Polymerization time (in hours) | Conversion, percent |
|---|---|---|---|---|
| 3A | 8 | 29 | 27 | 52 |
| 3B | 9 | 40 | 24 | 70 |
| 3C | 8 | 29 | 24 | 77 |
| 3D | 16 | 66 | 18 | 74 |

It can be noted that the smaller the DPXD amount, the faster the polymerization, and that it is advisable to introduce the whole amount of CHP at the beginning.

The specimens of the so obtained rubbers show a content of copolymerized glycidyl methacrylate (determined, as said above, by titration with hydrochloric acid) as reported in the following table:

Test No.: Percent by weight
3A _____ 16.6
3B _____ 14.8
3C _____ 14.1
3D _____ 15.5

Glycidyl methacrylate units in the final terpolymer.

It is worth noting that under the above indicated experimental conditions, the glycidyl methacrylate seems to possess a greater reactivity with respect to the other comonomers, as is shown by its content in the copolymer formed at the smaller conversions.

Example 4

This example shows the effect of the amount and of the different ways of addition of CHP and of DPXD on the polymerization rate of a system analogous, in all other respects, to the system of Test 2B of Example 2, namely by using 25 parts of glycidyl methacrylate based on a total of 100 parts of monomers.

The epoxy monomer, as well as the CHP and DPXD, are added as it is indicated for each single case. The operation is carried out in the same manner as that used for Test 2B of Example 2, except where it is otherwise stated.

The following polymerization formulations are used:

| Test No. | 4A | 4B | 4C | 4D |
|---|---|---|---|---|
| Butadiene | 60 | 60 | 60 | 60 |
| Styrene | 15 | 15 | 15 | 15 |
| Glycidyl methacrylate | 25 | 25 | 25 | 25 |
| Water | 180 | 180 | 180 | 180 |
| Nekal BX | 4 | 4 | 4 | 4 |
| Tamol N | 0.25 | 0.25 | 0.25 | 0.25 |
| DPXD | 0.09 | 0.09 | 0.09 | 0.09 |
| CHP | 0.28 | 0.35 | 0.35 | 0.35 |
| Rodite A | 0.2 | 0.2 | 0.2 | 0.2 |

The glycidyl methacrylate is added: in Test 4A, one-half at the beginning and one-half 8 hours later; in Tests 4B, 4C and 4D, 60% at the beginning and the remaining 40% 3 hours later (in Test 4B), 5 hours later (in Test 4C) and 8 hours later (in Test 4D).

The DPXD is added: two-thirds at the beginning and one-third 8 hours later in Test 4A; two-thirds at the beginning and one-third 5 hours later in Test 4B; the total amount at the beginning in Tests 4C and 4D.

The CHP is added: two-thirds at the beginning and one-third 8 hours later in Test 4A; 40% at the beginning and 20% (each time) 3 hours, 5 hours and 7 hours later, in Tests 4B and 4C; 40% at the beginning, 20% 3 hours later and the remaining 40% 8 hours later in Test 4D.

The polymerization proceeds as illustrated in the following table:

| Test No. | Polymerization time (in hours) | Conversion, percent | Polymerization time (in hours) | Conversion, percent |
|---|---|---|---|---|
| 4A | 8 | 35 | 24 | 92 |
| 4B | 5 | 30 | 9 | 50 |
| 4C | 5 | 31 | 10 | 55 |
| 4D | 7 | 32 | 24 | 88 |

At the highest polymerization times, the specimens of the obtained rubbers show a content of copolymerized glycidyl methacrylate, determined as previously described, and a Wallace plasticity as reported in the following table:

| Test No. | 4A | 4B | 4C | 4D |
|---|---|---|---|---|
| Glycidyl methacrylate units in the final terpolymer (percent by weight) | 23.1 | 28 | 26.7 | 24 |
| Wallace plasticity | | 19 | 25 | 87 |

Example 5

This example shows the much greater copolymerization rate of butadiene and glycidyl methacrylate in various proportions, in the presence or in the absence of styrene, in a system analogous to those of Examples 2–4, but in which the emulsifier is constituted by Aquarex D, instead of Nekal BX, i.e. in which the emulsifier is the same as in Example 1, referring to the copolymerization of butadiene with glycidyl acrylate and with styrene.

The procedure is the same as in the preceding examples.

The following polymerization formulations are used:

| Test No. | 5A | 5B | 5C | 5D | 5E |
|---|---|---|---|---|---|
| Butadiene | 85 | 70 | 75 | 60 | 47.5 |
| Styrene | | 15 | | 15 | 15 |
| Glycidyl methacrylate | 15 | 15 | 25 | 25 | 37.5 |
| Water | 180 | 180 | 180 | 180 | 180 |
| Aquarex D | 4 | 4 | 4 | 4 | 4 |
| Tamol N | 0.25 | 0.25 | 0.25 | 0.25 | 0.25 |
| DPXD | 0.06 | 0.06 | 0.06 | 0.06 | 0.06 |
| CHP | 0.19 | 1.19 | 0.28 | 0.19 | 0.19 |
| Rodite A | 0.2 | 0.2 | 0.2 | 0.2 | 0.2 |

All the additions are made at the beginning, with the exception of Test 5C, in which 40% of the glycidyl methacrylate and one-third of the CHP are added 2 hours later.

The following table shows the conversions obtained at the indicated times:

| Test No. | Polymerization time (in hours) | Conversion, percent | Polymerization time (in hours) | Conversion, percent |
|---|---|---|---|---|
| 5A | 2 | 49.1 | 5 | 62 |
| 5B | 2 | 52.4 | 5 | 69.2 |
| 5C | 2 | 58 | 5 | 87 |
| 5D | 2 | 56 | 5 | 78 |
| 5E | 2 | 80 | 4 | 91 |

The titration with hydrochloric acid on the coagulated specimens at the reported final conversions gives the following values:

| Test No.: | Percent by weight |
|---|---|
| 5A | 18.3 |
| 5B | 15.2 |
| 5C | 21.5 |
| 5D | 23.6 |
| 5E | 35.1 |

Glycidyl methacrylate units based on the final copolymer.

The obtained latices are completely stable.

The intrinsic "Vistex" viscosities at 30° C. in a toluene-isopropanol mixture (80:20 parts by volume) of the copolymers from 5A to 5E are:

$$1.66, 1.72, 1.0, 1.1 \text{ and } 1.16 \frac{100 \text{ ml.}}{\text{g.}}$$

respectively.

Example 6

This example shows the possibility of introducing into the polymerization system a fourth monomer, besides those indicated in the Examples 2–5. The selected fourth monomer is methacrylic acid, which offers the possibility of introducing into the polymer, besides the unsaturation due to the butadiene and besides the epoxy groups due to the glycidyl ester, also carboxy groups which, inter alia, render the polymer self curing.

The following polymerization formulations are used:

| Test No. | 6A | 6B | 6C |
|---|---|---|---|
| Butadiene | 70 | 70 | 60 |
| Styrene | 13 | 13 | 13 |
| Glycidyl methacrylate | 15 | 15 | 25 |
| Methacrylic acid | 2 | 2 | 2 |
| Water | 180 | 180 | 180 |
| Aquarex D | 4 | 4 | 4 |
| Tamol N | 0.25 | 0.25 | 0.25 |
| DPXD | 0.06 | 0.06 | 0.06 |
| CHP | 0.19 | 0.19 | 0.28 |
| Rodite A | 0.2 | 0.2 | 0.2 |

The operation is carried out in the usual way, with the difference that the methacrylic acid is added to the solution of the emulsifiers, the pH of which becomes in this way 3.25. In Test 6A, said pH is left unchanged; in Tests 6B and 6C it is adjusted to 5.3 by means of a small addition of NaOH in aqueous solution, so that in the final mixture the pH ranges between 6 and 8, while in Test 6A it is lower than 6.

The difference between Tests 6A and 6B, which have the same formulation, resides only in the pH value. In Test 6C 40% of the glycidyl methacrylate and one-third of the CHP are added two hours after the beginning of the polymerization. In the other two tests the various ingredients are added all at the beginning.

The system 6A, after 2 hours, reaches a conversion of 69.5%, whereas the system 6B is still at a conversion of 42%. The polymerization conversion for the system 6C, after 2 hours is 44%, after 5 hours 59% and after 8 hours 68%. The titration with hydrochloric acid on the obtained specimens gives the following values:

| Test No.: | Percent by weight |
|---|---|
| 6A | 11 |
| 6B | 19 |
| 6C | 22.5 |

Glycidyl methacrylate units based on the final copolymer.

It is evident that in Test 6A the low content of epoxy groups is due to the pH, which is too low, so that it causes their partial decomposition. Also, the obtained latex of type 6A is not quite stable. However, this case falls outside the allowed pH values indicated for the present method, as already mentioned above.

The intrinsic "Vistex" viscosities at 30° C. of the specimens 6B and 6C in a toluene-isopropanol mixture (80:20 parts by volume) are $$1.5 \text{ and } 1.4 \frac{100 \text{ ml.}}{\text{g.}}$$

respectively.

Example 7

In this example the epoxy monomer used is constituted by a glycidyl ether of an alkenylphenol, and more precisely of orthovinylphenol. This monomer, in combination with butadiene and in some cases with styrene, is used to obtain the desired epoxy elastomers. The polymerization is carried out at 30° C. The procedure is the same as indicated in Examples 1–6, unless otherwise stated.

The following polymerization formulations are used:

| Test No. | 7A | 7B | 7C | 7D | 7E |
|---|---|---|---|---|---|
| Butadiene | 70 | 85 | 85 | 50 | 50 |
| Styrene | 15 | | | | |
| Glycidyl ether of orthovinylphenol | 15 | 15 | 15 | 30 | 34 |
| Water | 200 | 200 | 190 | 190 | 190 |
| Nekal BX | 4 | 4 | 4 | 4 | 4 |
| Tamol N | 0.25 | 0.25 | 0.25 | 0.25 | 0.25 |
| DPXD | 0.1 | 0.1 | 0.1 | 0.1 | 0.1 |
| CHP | 0.7 | 0.7 | 0.42 | 0.56 | 0.56 |
| Rodite A | 0.6 | 0.6 | 0.4 | 0.4 | 0.4 |
| Benzene | | | | 22 | 22 |

In Tests 7D and 7E one-third of the glycidyl ether of orthovinylphenol is added 8 hours after the beginning of the polymerization.

CHP is added: in Tests 7A and 7B 20% at the beginning, 10% 3½ and 7 hours later, 20% 8½ and 24 hours later, 10% 30 and 32 hours later; in Test 7C, one-third at the beginning, one-third 3½ hours later and the remainder 8 hours later; in Tests 7D and 7E, one-quarter at the beginning and one-quarter 2 hours, 8 hours and 24 hours later.

In Tests 7A and 7B, the Rodite A is added: one-third at the beginning and one-third 3½ and 24 hours later. In Tests 7C, 7D and 7E it is added: one-half at the beginning and one-half 8 hours later.

In Tests 7D and 7E benzene is added in order to improve the compatibility between butadiene and glycidyl ether of orthovinylphenol, as the latter is not very soluble in the aliphatic hydrocarbons; the effect of this addition on the polymerization rate, when large amounts of said glycidyl ether are employed, is very remarkable.

The following table shows the conversions obtained at the indicated times:

| Test No. | Polymerization time (in hours) | Conversion, percent | Polymerization time (in hours) | Conversion, percent |
|---|---|---|---|---|
| 7A | 24 | 57 | 48 | 82 |
| 7B | 24 | 58 | 48 | 86 |
| 7C | 8 | 20 | 27 | 61 |
| 7D | 24 | 60 | | |
| 7E | 24 | 34 | 31 | 57 |

The specimens of the rubbers corresponding to the last conversions respectively contain:

| Test No.: | Percent by weight |
|---|---|
| 7A | 16 |
| 7B | 13.7 |
| 7C | 16 |
| 7D | 43 |
| 7E | 57 |

Glycidyl ether of orthovinylphenol units in the copolymer.

The Wallace plasticity at the highest conversions is in general low, i.e. of the order of 70–80.

The intrinsic "Vistex" viscosities at 30° C. in toluene-isopropanol (80:20 parts by volume) of the copolymers from 7A to 7E are $$1.05, 0.95, 0.77, 0.73 \text{ and } 0.87 \frac{100 \text{ ml.}}{\text{g.}}$$

respectively.

As already stated, one of the most interesting features of the elastomers obtained by copolymerization of conjugated dienes with alkenyl monomers, containing in their molecules also epoxy groups, said copolymerization being effected (in some cases also in the presence of other vinyl monomers) in such a way that said epoxy groups remain unchanged in the resulting copolymer, is that they can be vulcanized, besides by using sulphur and conventional accelerators for rubber, also by cross-linking them by means of the epoxy groups, that is by using some of a very large number of substances, namely those which are called "hardeners" in the technology of the epoxy resins and which, by acting on the epoxy resins, are able to transform them into insoluble and infusible compounds.

As is known, this effect is due to the building of three-dimensional networks, which effect can be enhanced by the addition of further particular substances having a catalytic action, known as "activators" or "accelerators."

The above indicated hardening agents can be of the acid or basic type, according to the Lewis definition, and in general they can be considered as poly-functional. Depending upon the various cases, these hardening agents can act at room temperature or at a more or less high temperature. Among the basic hardening agents, especially interesting are the amines, both as such and as more or less stable addition products, and the polyamides. Examples of said products are ethylenediamine, hexamethylenediamine, and polymethylenediamines in general, diethylenetriamine, triethylenetetramine, tetraethylenepentamine, piperazine, metaphenylenediamine, metatoluylenediamine, melamine, benzoguanamine, dicyandiamide, menthanediamine. Said aminic products are very active even at relatively low temperatures and without the addition of accelerators or activators. Examples of hardening agents of acid type are in particular the anhydrides of dibasic or polybasic acids such as the phthalic, hexahydrophthalic, tetrahydrophthalic, endomethylenetetrahydrophthalic, hexachloroendomethylenetetrahydrophthalic, trimellitic, pyromellitic, and dodecenyl-succinic anhydrides. These anhydrides show generally a lesser activity than the amines indicated above as hardening agents and may require the presence of activators, as for instance triethylenediamine, dimethylaminomethylphenol, tris-(dimethylaminomethyl) phenol, pyridine and its derivatives, among which also the vinylpyridine-rubbers, constituted by butadiene-styrene-vinylpyridine terpolymers, are included. Other compounds which react with the epoxy groups and can therefore be useful for their cross-linking are the substances known as Friedel-Crafts catalysts (among which are very suitable the complexes of boron trifluoride, for instance with amines), the fatty acid salts of the amines, compounds containing hydroxy groups as for instance the polyhydric alcohols, the polyhydroxyphenols, the phenolic and ureic resins, the dithiols and the polythiols and their derivatives such as polysulphides, and at last the condensation products of the aldehydes with primary amines and with many other substances. As in the case of anhydrides, the action of several compounds of this group is activated by the presence of substances such as the tertiary amines.

As already stated, all of the above cited compounds and in general all those already known as hardening agents for the epoxy resins can be used, under suitable conditions, for obtaining vulcanizates of the epoxy elastomers of the present invention. This permits the obtention of a very large range of differently cross-linked products, the chemical and physical properties of which can widely differ, and which may be employed in many applications. The extent of cross-linking of the polymers made in accordance with the present invention and cross-linked by the means of the epoxy groups, is obviously affected by the larger or smaller content of said groups.

The following examples illustrate some of the various vulcanization systems indicated above:

Example 8

This example illustrates how an epoxy elastomer, prepared in accordance with the invention, can be vlucanized both with sulphur and with a product of the acidic type, such as dodecenylsuccinic anhydride (DDSA).

Together with the formulations of the compounds, the following table reports the mechanical parameters of vulcanized specimens obtained at three different vlucanization times.

The terpolymer 2A of Example 2, containing about 18% of combined glycidyl methacrylate, is used in these compounds:

| Compound No. | 1 | 2 | 3 | 4 |
|---|---|---|---|---|
| Terpolymer 2A | 100 | 100 | 100 | 100 |
| Lamp black | 60 | 60 | 60 | 60 |
| Zinc oxide | 5 | 5 | 5 | 5 |
| Benzothiazyl disulphide | 1.5 | 1 | 1.5 | 1.5 |
| Stearic acid | 1.5 | | | |
| Sulphur | 1.6 | | | |
| DDSA | | 15 | 10 | 1 |
| DMP-10* | | 2 | | |
| PHYSICAL PROPERTIES | | | | |
| Cure: 5 minutes at 143° C.: | | | | |
| Modulus at 100% elongation (kg./cm.²) | | 140 | | |
| Tensile strength (kg./cm.²) | | 172 | | |
| Elongation at break (percent) | | 130 | | |
| Cure: 20 minutes at 143° C.: | | | | |
| Modulus at 100% elongation (kg./cm.²) | 130 | | 140 | 10 |
| Tensile strength (kg./cm.²) | 190 | 175 | 150 | 38 |
| Elongation at break (percent) | 185 | 75 | 130 | 520 |
| Cure: 80 minutes at 143° C.: | | | | |
| Modulus at 100% elongation (kg./cm.²) | 162 | | | 95 |
| Tensile strength (kg./cm.²) | 162 | 123 | 140 | 160 |
| Elongation at break (percent) | 100 | 50 | 70 | 190 |

*Dimethylaminomethylphenol from Rohm & Haas Co.

As can be seen, the specimens vulcanized with sulphur are somewhat stiff, but sufficiently stable to overcure. Specimens of compound 1 can be bonded by vulcanization to specimens of natural rubber, SBR and other diene rubbers, similarly compounded with sulphur and accelerators, thus showing the compatibility of the epoxy rubber with the other diene rubbers.

The rate of vulcanization of compound 2 with DDSA activated by DMP 10 is very high and originates considerably stiff products, having a tendency to overcure.

By eliminating the activator and by reducing the amount of DDSA to very small amounts (compounds 3 and 4), the vulcanization rate progressively decreases, although it remains satisfactory, and the degradation of the mechanical parameters due to overcure (compound 3) is less pronounced.

Example 9

This example, concerning the use of sulphur-vulcanization, illustrates the effect of the type of the added carbon black on the mechanical parameters of the vulcanized elastomers.

The terpolymer 2B of Example 2, with about 28% of combined glycidyl methacrylate, is used in the compounds.

| Compound No. | 5 | 6 |
|---|---|---|
| Terpolymer 2B | 100 | 100 |
| MPC channel black | 40 | |
| Lamp black | | 60 |
| Zinc oxide | 5 | 5 |
| Benzothiazyl disulphide | 1.5 | 1.5 |
| Stearic acid | 1.5 | 1.5 |
| Sulphur | 1.4 | 1.4 |
| PHYSICAL PROPERTIES | | |
| Cure: 20 minutes at 143° C.: | | |
| Modulus at 100% elongation (kg./cm.²) | 102 | 80 |
| Tensile strength (kg./cm.²) | 136 | 160 |
| Elongation at break (percent) | 120 | 260 |
| Cure: 80 minutes at 143° C.: | | |
| Tensile strength (kg./cm.²) | 113 | 200 |
| Elongation at break (percent) | 60 | 95 |

As can be seen, also by means of relatively short curing times, vulcanizates having good mechanical strength are obtained with both types of blacks.

The low pH of the MPC black probably catalyses the cross-linking due to the epoxy groups, increasing the stiffness over that obtainable in the case of the normal rubbers in the vulcanization with sulphur and accelerators. Practically, this does not occur in the presence of lamp black, whose pH is nearer to the neutral point.

During vulcanization it is possible to obtain a good bond of these compounds with compounds based on conventional diene elastomers, also vulcanized with sulphur and accelerators.

Example 10

This example illustrates the vulcanization of the elastomers of the present invention with acidic or aminic compounds and the combined effect of sulphur and of hardening agents, both acidic and aminic.

The terpolymers 3A and 4A of Example 3 and 4, containing respectively about 16% and 23% of combined glycidyl methacrylate, are used in the following compounds:

| Compound | 7 | 8 | 9 | 10 | 11 | 12 | 13 |
|---|---|---|---|---|---|---|---|
| Terpolymer 3A | 100 | 100 | 100 | 100 | 100 | | |
| Terpolymer 4A | | | | | | 100 | 100 |
| EPC channel black | 40 | 40 | 40 | 40 | 40 | 40 | 40 |
| Zinc oxide | 5 | 5 | 5 | 5 | 5 | 5 | 5 |
| Benzothiazyl disulphide | 2 | | | 1.6 | 1.5 | 2 | 2 |
| Stearic acid | 1.5 | 1.5 | 1.5 | 1.5 | 1.5 | 1.5 | 1.5 |
| Sulphur | 2 | | | 1.6 | 1.5 | 2 | 2 |
| DDSA | | 12 | | 2 | | | |
| Tetraethylenepentamine | | | 4 | | 1 | | 0.4 |
| Physical properties: | | | | | | | |
| Cure at 143° C. (minutes) | 20 | 40 | 20 | 20 | 20 | 20 | 20 |
| Modulus at 100% elongation (kg./cm.$^2$) | 40 | 109 | 76 | 20 | 21 | 100 | |
| Tensile strength (kg./cm.$^2$) | 116 | 120 | 160 | 106 | 130 | 131 | 120 |
| Elongation at break (percent) | 220 | 125 | 190 | 260 | 380 | 140 | 80 |

From examination of these results, the possibility of vulcanizing the epoxy elastomers with sulphur or with acidic compounds or with aminic compounds and at last both with sulphur and acidic or aminic compounds simultaneously, is clearly evident. Therefore, it can be stated that the two vulcanization methods, through the double bonds of the polymer with sulphur and through the epoxy groups, are consistent with each other and can co-exist.

Example 11

This example illustrates the vulcanization of copolymers, in which the epoxy component is a glycidyl ether of a phenol, by means of a product different from sulphur, and more precisely by DDSA. The polymers prepared according to Example 7, starting from butadiene and the glycidyl ether of ortho-vinylphenol, and in one case (Test 7A) also from styrene, are used in the following compounds. The polymerization is stopped after reaching different conversions. The content of combined epoxy monomer is in every case about 15%.

| Compound No | 14 | 15 | 16 |
|---|---|---|---|
| Terpolymer 7A | 100 | | |
| Copolymer 7B | | 100 | |
| Copolymer 7C | | | 100 |
| Lamp black | 60 | 60 | 60 |
| Zinc oxide | 5 | 5 | 5 |
| Benzothiazyl disulphide | 1 | 1 | 1 |
| DDSA | 10 | 10 | 10 |

PHYSICAL PROPERTIES

| Cure: 30 minutes at 143° C.: | | | |
|---|---|---|---|
| Modulus at 100% elongation (kg./cm.$^2$) | 40 | 75 | 80 |
| Tensile strength (kg./cm.$^2$) | 160 | 110 | 190 |
| Elongation at break (percent) | 280 | 140 | 240 |

Also, with these compounds a very good bond can be attained by vulcanization to the compounds based on conventional unsaturated rubbers vulcanized with sulphur and accelerators, in spite of the fact that the above referred to compounds are instead vulcanized by opening of the oxirane rings; this confirms the compatibility of the two vulcanization methods, already shown in the preceding example.

As it appears from Examples 8 to 11, the copolymers made in accordance with the present invention, and in particular the elastomeric copolymers, can be used for the preparation of compositions liable to be cross-linked either with sulphur and accelerators, owing to the presence of double bonds between carbon atoms, or with hardening agents acting on the epoxy groups, and moreover by means of the two systems, simultaneously or subsequently; other normal ingredients, such as fillers, plasticizers, anti-agers, etc., can also be present.

The possibility of cross-linking said copolymers with sulphur and accelerators allows their use in vulcanizable compositions containing also conventional elastomers and/or resins, still with the addition of the necessary ingredients, in order to obtain particular effects, as for instance good resiliency, notwithstanding the high stiffness, and good resistance to oils and fuels and in general to all the causes of deterioration.

Said vulcanizable compositions may also be used, at least in part, in the production of many different articles, as for instance coated cylinders, lined tanks, flat belts, V- and toothed belts, solid and semi-pneumatic rings, pneumatic tires, pickers and other accessories for the textile industry, slabs and plates for domestic and industrial flooring, conveyor belts, tubes, soles and heels, molded and extruded packings, supports, shock-absorbers and damping elements, sheaths for electric cables, sealing ends and other accessories for the electric industry, brake shoes, resilient supporting plates for bridges, rails and girders, tarpaulins, flexible containers for liquids, dipping products and extruded products obtained from latex.

In the foregoing specification and in the following claims the term "copolymer" is used in its widest meaning to indicate polymers constituted by monomeric units of several types, including therefore the polymers usually called terpolymers, tetrapolymers and so on.

What is claimed is:

1. A method for the preparation of copolymers soluble in organic solvents and having an intrinsic "Vistex" viscosity, evaluated on said copolymers when obtained in emulsion, higher than 0.5, comprising copolymerizing a monomer having the formula

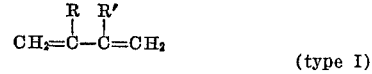

(type I)

wherein R and R', independently of each other, are selected from the group consisting of hydrogen, chlorine, and a methyl group, with a monomer having the formula

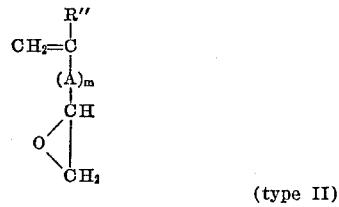

(type II)

wherein A is constituted by a bivalent organic radical, $m$ is an integer lower than 2, whose value can also be zero, and R" is a member selected from the group consisting of hydrogen, chlorine and a monovalent alkyl group containing up to 4 carbon atoms, the ratio by weight between the total of the monomeric units of type I and the total of the monomeric units of type II ranging between 98:2 adn 1:4, said copolymerization being effected in aqueous emulsion with a free radical mechanism, at a temperature between 5 and 60° C. and at a pH from 6 to 8.

2. A method as defined in claim 1, in which the monomers suitable to originate in the copolymers the monomeric units of type I are organic compounds selected from the group consisting of 1,3-butadiene and its homologues, isoprene and 2,3-dimethylbutadiene and chloroprene.

3. A method as defined in claim 1, in which the monomers suitable to originate in the copolymers the monomeric units of type II are organic compounds having in their molecules both one alkenyl group and at least one epoxy group.

4. A method as defined in claim 1, in which there are employed as emulsifiers alkaline salts of acids selected from the group consisting of the alkylsulphonic, arylsulphonic and alkylarylsulphonic acids in a total amount not higher than 10% based on the total weight of the monomers, in the presence of initiators of free radical copolymerization and of a modifier for the regulation of the molecular weight.

5. A method as defined in claim 4, in which the initiating system of the free radical copolymerization is a "redox" system comprising isopropyl benzene hydroperoxide and sodium formaldehyde-sulphoxylate each of them in an amount smaller than 1% based on the total weight of the monomers.

6. A method according to claim 1, further comprising carrying out the copolymerization with an additional monomer having the formula

(type III)

in which R''' is selected from the group consisting of hydrogen, chlorine, and an alkyl group containing up to 4 carbon atoms, and R'''' is a monovalent organic radical selected from the group consisting of a phenyl group, a pyridyl group, a substituted pyridyl group, a cyanogen group, a carboxy group, an esterified carboxy group, a methoxy group, an ethoxy group, and a 2-methyl-propoxy group, and the total weight of the monomeric units of type III not exceeding two-thirds of the total weight of the monomeric units of types I and II.

7. A method as defined in claim 6, in which the monomers suitable to originate in the copolymers the monomeric units of type III are organic compounds selected from the group consisting of styrene, acrylic acid and alpha-methylacrylic acid.

References Cited

UNITED STATES PATENTS

| | | | |
|---|---|---|---|
| 2,788,339 | 4/1957 | Rothrock | 260—85.7 |
| 2,839,514 | 6/1958 | Shokal | 260—88.1 |
| 3,383,372 | 5/1968 | Spivey | 260—86.7 |
| 2,524,432 | 10/1950 | Dorough | 260—83.5 |
| 2,723,971 | 11/1955 | Cupery | 260—83.5 |
| 3,156,674 | 10/1964 | Shokal et al. | 260—80.7 |

OTHER REFERENCES

Emulsion Polymerization by Bovey, Kolthoff, Medalion et al., pp. 15, 18, 19, 20, 21, 141.

JOSEPH L. SCHOFER, *Primary Examiner.*

ROGER S. BENJAMIN, *Assistant Examiner.*

U.S. Cl. X.R.

260—80.72, 80.73, 80.76, 80.77, 80.78 80.81, 83.5, 86.7